US008908486B2

(12) United States Patent
Butt et al.

(10) Patent No.: US 8,908,486 B2
(45) Date of Patent: *Dec. 9, 2014

(54) METHOD FOR EXTENDED DIAGNOSTIC OVERLAY CONTROL FOR TAPE STORAGE DEVICES

(71) Applicant: International Business Machines Corporation, Armonk, NY (US)

(72) Inventors: Kevin D. Butt, Tucson, AZ (US); Ernest S. Gale, Tucson, AZ (US); Pamela R. Nylander-Hill, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,371

(22) Filed: Feb. 1, 2013

(65) Prior Publication Data
US 2013/0142023 A1  Jun. 6, 2013

Related U.S. Application Data

(63) Continuation of application No. 13/149,761, filed on May 31, 2011.

(51) Int. Cl.
G11B 27/36 (2006.01)
(52) U.S. Cl.
CPC ........... *G11B 27/36* (2013.01); *G11B 2220/90* (2013.01)
USPC ....................................................... 369/53.1
(58) Field of Classification Search
None
See application file for complete search history.

(56) References Cited

U.S. PATENT DOCUMENTS

| 6,268,975 | B1  | 7/2001  | Bickers |
| 6,798,602 | B2  | 9/2004  | Greco |
| 7,277,246 | B2  | 10/2007 | Barbian et al. |
| 7,280,293 | B2  | 10/2007 | Nylander-Hill et al. |
| 8,717,698 | B2  | 5/2014  | Nylander-Hill et al. |
| 2006/0174353 | A1* | 8/2006  | Ryal ................................ 726/31 |

(Continued)

OTHER PUBLICATIONS

Non-Final Office Action from U.S. Appl. No. 13/149,761 dated Jun. 7, 2013.

(Continued)

*Primary Examiner* — Jason Olson
*Assistant Examiner* — Carl Adams
(74) *Attorney, Agent, or Firm* — Zilka-Kotab, PC

(57) ABSTRACT

According to one embodiment, a method includes monitoring a plurality of parameters relating to operation of a tape drive to collect data from the operation of the tape drive, receiving a specification of one or more user-specified parameters to log during one or more collection windows, wherein the one or more user-specified parameters are specified from the plurality of parameters, logging at least some of the data collected from the operation of the tape drive to a memory during the one or more collection windows, wherein the at least some of the data collected is stored in a tape map comprising a plurality of fields, the plurality of fields including at least one histogram field, at least one per-channel field, and at least one per-channel indicator field, and dynamically overlaying one or more fields from the plurality of fields with data collected from the one or more user-specified parameters.

15 Claims, 4 Drawing Sheets

(56) References Cited

U.S. PATENT DOCUMENTS

| | | |
|---|---|---|
| 2006/0176598 A1 | 8/2006 | Evans et al. |
| 2006/0190205 A1 | 8/2006 | Klein et al. |
| 2007/0014042 A1* | 1/2007 | Nylander-Hill et al. ........ 360/31 |
| 2007/0115579 A1 | 5/2007 | Ngo |
| 2007/0253088 A1 | 11/2007 | Clarke et al. |
| 2012/0307615 A1 | 12/2012 | Butt et al. |

OTHER PUBLICATIONS

Non-Final Office Action from U.S. Appl. No. 13/149,761 dated Jan. 15, 2014.

U.S. Appl. No. 14/331,188, filed on Jul. 14, 2014.

Notice of Allowance and Fee(s) Due from U.S. Appl. No. 13/149,761 dated Aug. 1, 2014.

* cited by examiner

METHOD FOR EXTENDED DIAGNOSTIC OVERLAY CONTROL FOR TAPE STORAGE DEVICES

RELATED APPLICATIONS

This application is a continuation of copending U.S. patent application Ser. No. 13/149,761, filed May 31, 2011; which is herein incorporated by reference.

BACKGROUND

The present invention relates to using extended diagnostics, and more particularly, to using overlay control for extended diagnostics for tape storage devices.

Many tape storage devices, such as an IBM® 3592/TS1140 storage tape drive, contain an internal data log for mapping measurable characteristics of the tape drive while in operation. This data log is often stored in buffer memory for retrieval and analysis. According to one particularly useful embodiment, the data log (sometimes referred to as a tape map) stores errors, significant events, operating ranges, and performance statistics for the core functional areas of the tape drive for the duration of a cartridge mount. This complex data structure is a component of a microcode dump file which is used for failure analysis by both engineering and general product support. The tape map content varies according to many factors, such as manufacturer, model, product generation, etc., but is basically a representation of a fixed set of metrics applied to the interaction between media, recording head, servo control, dataflow electronics, and microcode for a given cartridge mount.

During the course of product development and problem analysis, it is often the case where more specialized criteria and equipment are used to assess failure modes and development of optimization algorithms to improve overall read/write quality. This process is by nature iterative and experimental, with data under examination being very temporal. No method exists in the current art for porting such analytic data into an existing toolset.

BRIEF SUMMARY

In one embodiment, a method includes monitoring a plurality of parameters relating to operation of a tape drive to collect data from the operation of the tape drive, receiving a specification of one or more user-specified parameters to log during a collection window, wherein the one or more user-specified parameters are specified from the plurality of parameters, logging at least some of the data collected from the operation of the tape drive to a memory during the collection window, wherein the at least some of the data collected is stored in a tape map including a plurality of fields, and dynamically overlaying one or more fields from the plurality of fields with data collected from the one or more user-specified parameters. The plurality of fields include at least one histogram field, at least one per-channel field, and at least one per-channel indicator field.

Other aspects and embodiments of the present invention will become apparent from the following detailed description, which, when taken in conjunction with the drawings, illustrates by way of example the principles of the invention.

DETAILED DESCRIPTION

Figure 1:
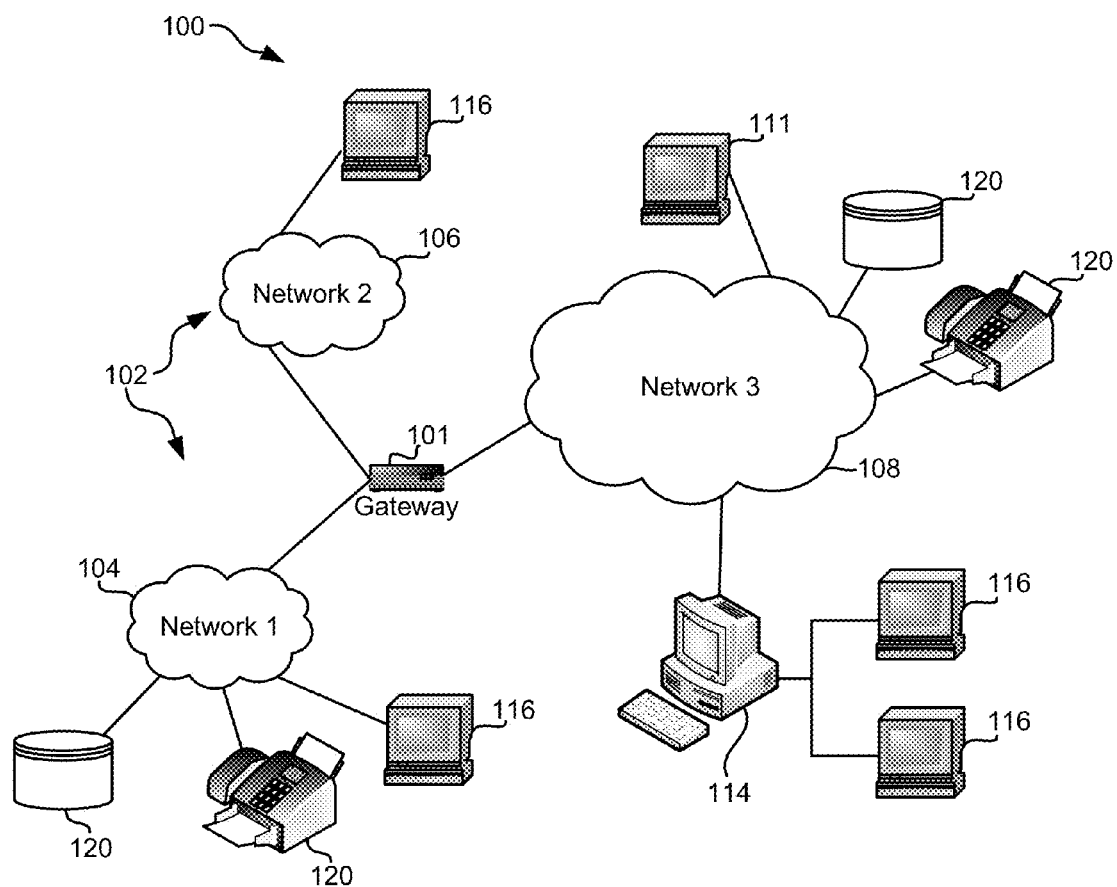
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

According to one embodiment, microcode control mechanisms are presented that dynamically alter tape map logging algorithms in order to leverage the static tape map layout into a flexible data structure which can dynamically redefine itself for more effective problem analysis. Although the tape map is generally applicable to IBM® tape drives, other manufacturers typically include some level of functionality that allows data about operation and configuration of the tape drive to be stored that may be more or less robust than a tape map, as described herein. However, for the sake of brevity, this collection of data will be referred to throughout the present descriptions as a tape map. In one embodiment, the static tape map layout may include data relating to any number of parameters, e.g., encode/decode methodology of the dataflow, recording channel performance, error recovery algorithms, servo control, error and incident detection, general usage, etc. The redefinition uses internal microcode support, but has external host interface control which allows a wide variety of tape map content to be overlaid based on interest and focus of the particular subsystem being investigated.

According to one general embodiment, a system includes a tape drive for reading from and/or writing to magnetic tape media, the tape drive having a memory, logic adapted for monitoring a plurality of parameters relating to operation of the tape drive to collect data from the operation of the tape drive, logic adapted for receiving a specification of one or more user-specified parameters to log during a collection window, wherein the one or more user-specified parameters are specified from the plurality of parameters, logic adapted for logging at least some of the data collected from the operation of the tape drive to the memory during the collection window, wherein the at least some of the data collected is stored in a tape map including a plurality of fields, and logic adapted for dynamically overlaying one or more fields from the plurality of fields with data collected from the one or more user-specified parameters. The plurality of fields includes at least one histogram field, at least one per-channel field, and at least one per-channel indicator field.

In another general embodiment, a computer program product includes a computer readable storage medium having computer readable program code embodied therewith. The computer readable program code includes code configured to monitor a plurality of parameters relating to operation of a tape drive to collect data from the operation of the tape drive, code configured to receive a specification of one or more user-specified parameters to log during a collection window, code configured to log at least some of the data collected from the operation of the tape drive to a memory during the collection window, wherein the at least some of the data collected is stored in a tape map including a plurality of fields, and code configured to dynamically overlay one or more fields from the plurality of fields with data collected from the one or more user-specified parameters. The one or more user-specified parameters are specified from the plurality of parameters and the plurality of fields include at least one histogram field, at least one per-channel field, and at least one per-channel indicator field.

In yet another general embodiment, a method includes monitoring a plurality of parameters relating to operation of a tape drive to collect data from the operation of the tape drive, receiving a specification of one or more user-specified parameters to log during a collection window, wherein the one or more user-specified parameters are specified from the plurality of parameters, logging at least some of the data collected from the operation of the tape drive to a memory during the collection window, wherein the at least some of the data collected is stored in a tape map including a plurality of fields, and dynamically overlaying one or more fields from the plurality of fields with data collected from the one or more user-specified parameters. The plurality of fields include at least one histogram field, at least one per-channel field, and at least one per-channel indicator field.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
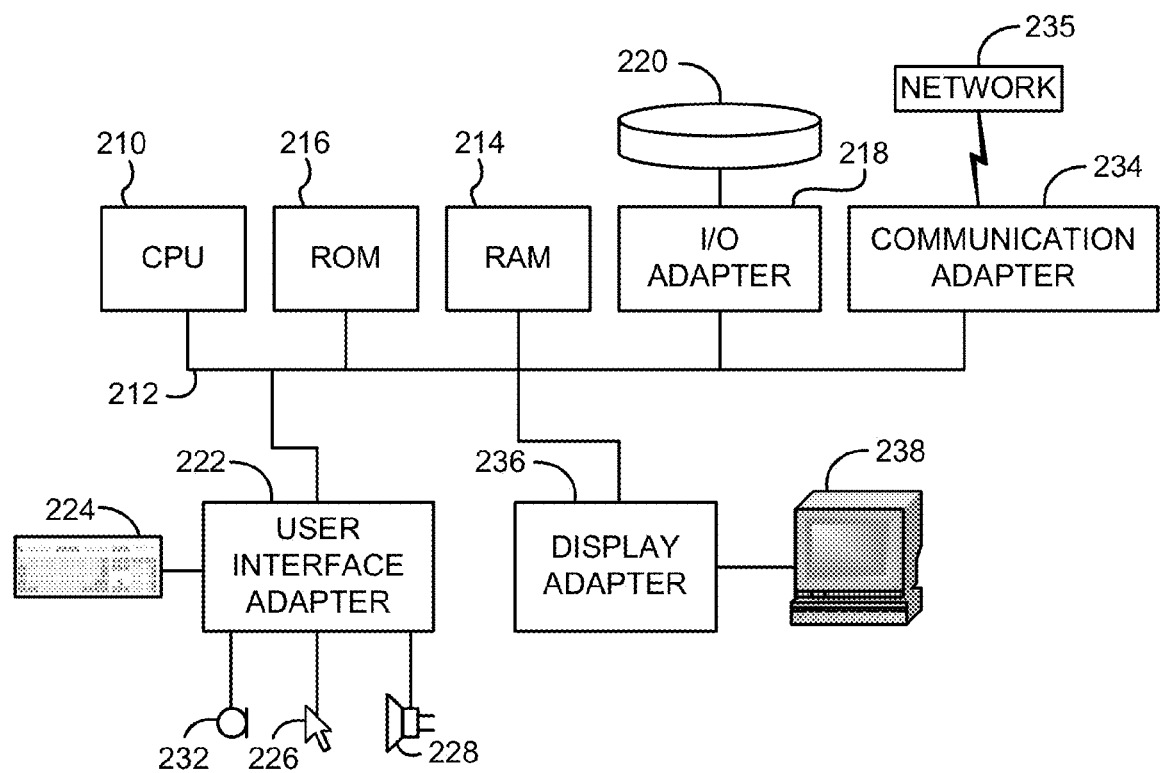
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Tape map header changes may be used to identify which fields are being overlaid, according to one embodiment. In general, per-channel logging fields and histograms are eligible to be overlaid, but other fields may be used according to what actual fields are available in the tape map, as would be understood by one of skill in the art upon reading the present descriptions. When one or more overlays have been specified, these data structures will no longer log nominal (default) content, but instead will log the information as specified in the tape map header. Based on user specification, not only the content but the collection timing may be dynamically modified. Although per-channel and histogram'd data assumes a certain content, the user can pass whatever data is pertinent to the problem under study. For example, the owner may specify modifications to 32 data channel logging but the data passed may be unrelated to that.

In typical usage, overlays are transitory in nature and are intended to be flexible. However, they are not so limited. Both data content and overlay combinations are up to user discretion. If a given modification becomes a standard practice, then it may become a standard invocation with a permanent microcode implementation, in one embodiment. In that case, users need only request it from the set of defined options, and overlaying is not required.

This design has two primary interfaces for support, according to one embodiment: at least one external host command interface, and at least one internal tape map interface. Other interfaces may be used according to the design parameters, system configuration, etc., as would be appreciated by one of skill in the art upon reading the present descriptions. When application of a pre-defined overlay is desired, only command invocation at the host interface is used. When engineering overlays are desired, additional microcode support may be used prior to host invocation. There a tape map/owner interface is defined, and the owner subsystem is modified to provide data at the appropriate collection windows in order for the scheme to operate properly. As such, engineering overlays tend to be vendor-specific and not targeted to field support, but may be used in the field when available to do so.

In addition, a visual representation of the static analysis of the tape map may also be generated using outside processing (or formatting). Using that visual output, the default metrics can be analyzed by category or in combination with other metric categories. This is a method of failure analysis, but also a way to improve overall read/write quality by observing patterns and error signatures for possible optimization. Any number of overlays can be requested to any set of metrics in order to analyze new metrics in relation to default metrics.

Tape map data collection behavior can be controlled by two host commands (one for option read and one for option write), according to one approach. Default control may be asserted when a cartridge is successfully loaded. While the cartridge is loaded, the host Tape Map Write Control command may then modify basic tape map collection behavior and/or specify a range of overlay options that modify field collection. The overlays are honored unless restricted by special features or other configuration limitations. These limitations and options may be identified, detected, or otherwise known by issuing a host Tape Map Read Control command. Control persists for the current mount or until another control change is made, according to preferred embodiments.

Two new host commands may be specified to provide a new interface to tape map control: Tape Map Read Control and Tape Map Write Control. These new commands are intended to replace prior methods of host interface control to the tape map, but in some embodiments, they made be made in addition to existing tape map control. The new commands are self-defining in that there is flexibility to: modify basic tape map control (unrelated to overlay control); summarize a range of overlay options and settings available for the basic tape map logging mode selected, the product generation, and the recording format; and enable the ability to accept one or more specified overlays and apply them in combination.

Overlay control is self-defining, in one embodiment, since available options change according to manufacturer, product generation, recording format, and with changes to basic tape map control. The Read Tape Map Control command allows users to browse allowed overlay options and settings for their current configuration. This feedback, according to one embodiment, includes information such as max counter size so that users know how to log or scale data for each option in the current configuration. It is a flexible interface that allows new options and settings to be made available without change to a default host command structure.

A histogram, in one implementation, is a numeric representation that organizes data into a group of any number of specified ranges, such as two ranges, three ranges, four ranges, five ranges, etc. The ranges are in increasing sequence for integers n, m, and p, as shown for an example of four ranges: Histogram Group 1: Range=0 to n; Histogram Group 2: Range=n+1 to n+m; Histogram Group 3: Range=n+m+1 to n+p; and Histogram Group 4: Range=greater then n+p.

There are a variable number of histograms for each default tape map control mode and for each manufacturer's tape drive, generation, and recording format. Typically, these histograms track dataflow encode/decode parameters, but are not so limited. The user has the option of allowing the tape map microcode to select the overlay histogram or the user may opt to specify one or more specific histograms to overlay, in some approaches. The user also has the option to pass pre-histogram'd data on the internal interface or to provide numeric ranges that allow collection data to be histogram'd by the tape map interface collection code, in more approaches. The collection window may also be controlled.

A recording head is the physical interface between a recording apparatus and a moving recording medium. The magnetic head has a set of elements and optimizing electronics that records encoded data using a set of parallel data channels. Depending on the format, the number of parallel channels varies (e.g., 8, 16, 32).

There are a variable number of per-channel sets for each default tape map control mode and for each manufacturer's tape drive, generation, and recording format. The tape map typically logs performance on each channel using dataflow encode/decode metrics. The user has the option of allowing the tape map microcode to select the per-channel set to overlay or the option to select one or more specific per-channel sets for overlay, according to some approaches. The user may also control the collection window.

A more limited per-channel logging overlay is also available, in some approaches. Since an overlay implies data substitution (loss of information), it may be of value to initially narrow overlay logging to a simple threshold indication, in one embodiment. Indicators are implemented as a bit-mask (1-bit per data channel). At the specified timing, only indicators will be collected from the owner subsystem. These indicators are stored separately in the tape map and do not overlay default per-channel logging fields Based on analysis of these indicators in the tape map, users may opt to enable/disable other per-channel overlays, according to some embodiments.

Overlays can be done singly or in combination. This allows flexibility to scope different fields in relationship to each other. For example, in one embodiment, all of these overlays can be active simultaneously: Histogram; Per-Channel Overlay; and Per-Channel Overlay Indicators.

At a minimum, the user can specify a simple overlay where Tape Map code decides what data structures to overlay. The user, however, can fully specify the target histograms and/or data structures to overlay in some approaches.

A change in default control mode will reset all active overlays as well as tape map data. The user may then re-establish any desired overlays. Histogram and Per-Channel overlays may also be enabled or reset independently. However, any overlay change resets tape map data content, in some approaches.

The host interface Write Tape Map Control command uses specification of an owner since this identifies the internal microcode interface to the tape map. New owner interfaces rely on microcode support, so the host interface Read Tape Map Control command is used to identify which owners are defined for the current configuration.

The collection window dictates the timing at which data will be pulled from the owner subsystem to be logged to the tape map. There are three defined options: every dataset, at wrap/region boundaries, or event driven. This allows for flexible data capture.

Using the default controls, the tape map may be set to one of several default logging modes, as would be understood by one of skill upon reading the present descriptions. One of these basic logging modes is Dataset Logging mode. This mode is different than other logging modes in that each entry in the tape map represents one dataset. Other modes accumulate a set of datasets into a logging region defined positionally by wrap and region. A region is, in one embodiment, one of 128 virtual tape sections running lengthwise from beginning of tape to end of tape. Of course, other tape formats may have more or less regions, as would be understood by one of skill in the art. A wrap can be defined as a collection of 128 sections (or regions) on which data is recorded. The cartridge contains a variable number of wraps depending on manufacturer, format, and capacity.

Dataset Logging mode is a detailed tape map view on a dataset by dataset basis. For example, recent tape map buffer sizes allow upwards of 11,000 individual datasets to be stored for analysis, in some embodiments. In this logging mode, the tape map buffer is a wrapping buffer, so most recently processed datasets will appear in the tape map. Other basic logging modes are counter-based, so all datasets for the cartridge mount are represented and buffer-wrap does not apply, according to other embodiments.

Dataset logging mode is useful to assess the affect of optimization activity on read/write quality. According to one embodiment, owner subsystems have access to an internal interface which stops buffer wrap. This trigger is based on owner subsystem criteria (optimization done, threshold, error event, error signature, etc.). The tape map buffer continues to fill, but stops at the wrap point. When formatted, the trigger location is identified to allow the user the opportunity to see before/after changes in read/write quality.

Trap Mode is an optional control unrelated to tape map logging, according to one embodiment. There are defined traps and engineering traps that may be used. A trap is defined as monitoring of a given error, event, and/or criteria by both frequency and location on tape. When in Trap Mode, an informational forced sense command is logged at each wrap/region transition where traps were detected. Request Sense fields are overlaid with further engineering data related to the particular trap. Like the overlays, traps have an owner specified. Since traps do not log to the tape map, enabling or disabling them does not cause tape map data to reset.

According to one embodiment, a system, such as that represented in any of FIGS. 1-2, comprises a tape drive for reading from and/or writing to magnetic tape media, the tape drive having a memory. Now referring to FIG. 3, logic for performing logging functions is described according to one embodiment.

Figure 3:
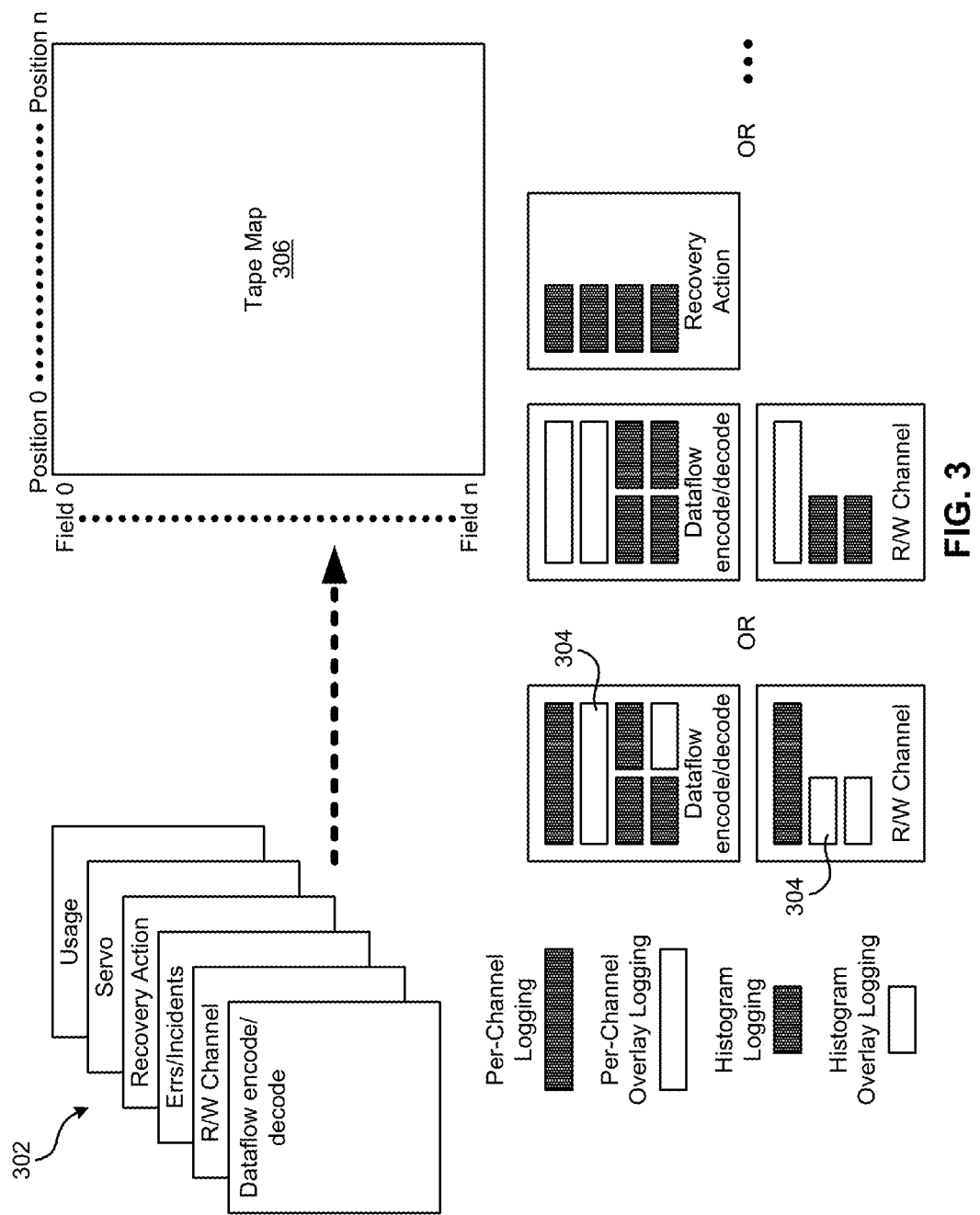
FIG. 3 shows tape map data logging and overlay logging, according to one embodiment.

As shown in FIG. 3, the system comprises logic adapted for monitoring a plurality of parameters relating to operation of the tape drive to collect data from the operation of the tape drive. The parameters 302 may include any information from operation of the tape drive, e.g., encode/decode of the dataflow, recording channel, error recovery algorithms, servo, errors/incidents, usage, etc.

The system also includes logic adapted for receiving a specification of one or more user-specified parameters to log during one or more collection windows. The one or more user-specified parameters are specified from the plurality of parameters, e.g., each parameter is monitored, and the user-specified parameters are those which are not recorded in the tape map by default, in one approach. In addition, the system includes logic adapted for logging at least some of the data collected from the operation of the tape drive to the memory during the one or more collection windows, such as in a tape map 306 comprising a plurality of fields, and logic adapted for dynamically overlaying 304 one or more fields from the plurality of fields with data collected from the one or more user-specified parameters. The plurality of fields comprise at least one histogram field, at least one per-channel field, and at least one per-channel indicator field.

The tape map 306 may include any number of fields, such as 8, 16, 32, 64, 128, 256, etc., and the fields may be of any type, such as histogram fields, per-channel fields, and/or per-channel indicator fields, as described previously. Of course, any other type of field may be used, as would be understood by one of skill in the art upon reading the present descriptions. The tape map 306 may also include samples taken from a plurality of different positions, such as tape wraps, between datasets, etc., on a magnetic tape medium, according to one embodiment.

In one embodiment, the tape drive may comprise the memory as a buffer, possibly with a first-in-first-out (FIFO) retention scheme, or any other scheme as would be apparent to one of skill in the art.

In one approach, the system may further comprise logic adapted for providing a user with an interface to specify one or more parameters from the plurality of parameters to log in the tape map. This interface may be a graphical user interface (GUI), code line input, or any other input module as would be understood by one of skill in the art.

In another approach, the system may further comprise logic adapted for sending the tape map from the memory of the tape drive to another system. In this way, the tape map may be off-loaded from the tape drive periodically or after occurrence of an event, thereby collecting a set of metrics as close to an event of interest as possible.

In one embodiment, the system may comprise logic adapted for dynamically altering the one or more collection windows in response to receiving a user-specified collection window for one of the one or more user-specified parameters. The user may specific any event, period, response, etc., in which to base the collection window upon. In another embodiment, the one or more collection windows may be defined by a period between datasets, a period between wrap boundaries, a period between region boundaries, or a period between event occurrences. In a further embodiment, the event may comprise at least one of: a user-specified event, and passage of a predetermined amount of time.

In another embodiment, the system may include logic adapted for identifying an owner of an interface from which at least one of the one or more user-specified parameters are sourced. In this way, it can be discovered which owner interface from which to source the one or more user-specified parameters.

In another embodiment, the system may further comprise logic adapted for altering a tape map header to reflect the one or more dynamically overlayed fields, and logic adapted for storing the tape map header to the memory. Also, when the owner interface from which the one or more user-specified parameters is identified, this owner interface information may be stored to the tape map header as well.

Figure 4:
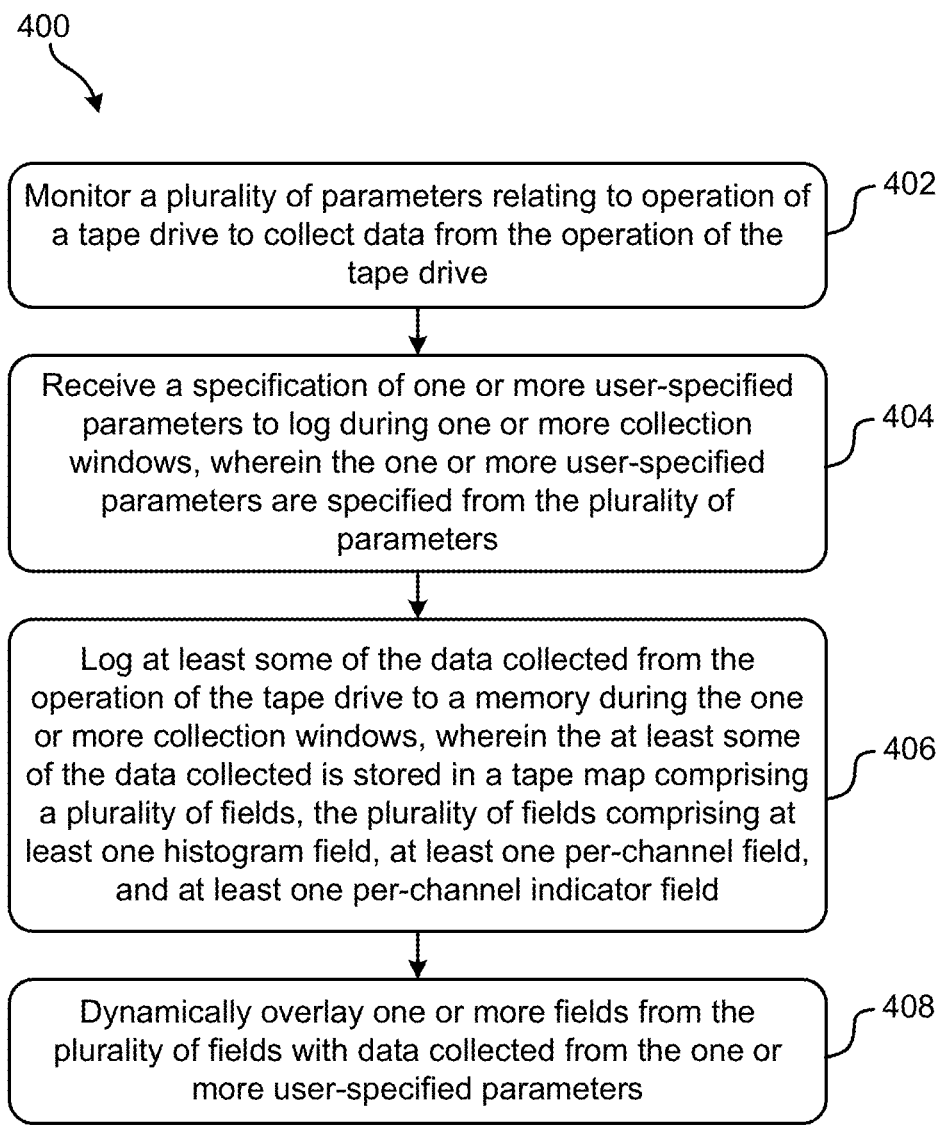
FIG. 4 illustrates a flowchart of a method, according to one embodiment.

Now referring to FIG. 4, a method 400 for tuning a system is shown according to one embodiment. The method 400 may be carried out in any desired environment, such as those described in FIGS. 1-3, among others.

In operation 402, a plurality of parameters relating to operation of a tape drive are monitored to collect data from the operation of the tape drive. The monitoring may be performed using any method as would be understood by one of skill in the art upon reading the present descriptions. The plurality of parameters, in one embodiment, include all parameters, values, scores, rates, etc., capable of being monitored by the tape drive.

In operation 404, a specification of one or more user-specified parameters to log during one or more collection windows is received. The one or more user-specified parameters are specified from the plurality of parameters, that is, they are parameters that may be monitored by the tape drive. In some additional embodiments, the tape drive may, prior to specification of the user-specified parameters, not have been able to monitor the user-specified parameters, but a microcode update may allow for the monitoring of these new user-specified parameters.

Also, in some embodiments, an owner may be identified of an interface from which the one or more user-specified parameters may be sourced, in order to gain access to these parameters.

In operation 406, at least some of the data collected from the operation of the tape drive is logged to a memory during the one or more collection windows. The at least some of the data collected is stored in a tape map comprising a plurality of fields. The plurality of fields comprise at least one histogram field, at least one per-channel field, and at least one per-channel indicator field. How the parameters are logged to each field type is different. For example, a histogram field allows for the collection of a plurality of different values, and therefore more than one single parameter may be logged in a histogram field. In another example, one or more parameters may have a relationship logged across different ranges in a histogram field. In yet another example, a per-channel indicator field is limited to producing only binary values, and therefore is capable of indicating the presence or absence of a parameter, that a parameter threshold has been exceeded, etc., as would be understood by one of skill upon reading the present descriptions.

In operation 408, one or more fields from the plurality of fields are dynamically overlayed with data collected from the one or more user-specified parameters. In this way, a default logging data structure, e.g., the tape map, may be used to convey data which is not conveyed by default. Since not all parameters that are capable of being monitored by the tape drive are logged in the tape map, overlaying may be used to indicate data which is not, by default, indicated by the tape map without requiring tape map structure changes, additional coding, or software tool changes to be implemented in order to collect and recognize this information.

In one embodiment, the method 400 may further comprise dynamically altering the one or more collection windows in response to receiving a user-specified collection window for one of the one or more user-specified parameters. In this way, the user may specify any length of collection window, or may correlate the collection window to one or more occurrences of events, such as a time period expiring, collection of a predetermined amount of data, etc. Also, whichever collection window is normally used or related to a certain user-specified parameter may be used to dynamically alter the one or more collection windows, in various embodiments.

According to some approaches, the collection window may be defined as a period between datasets, a period between wrap boundaries, a period between region boundaries, or a period between event occurrences. In some further approaches, the event may comprise at least one of: a user-specified event, and passage of a predetermined amount of time.

In another embodiment, the method 400 may further comprise altering a tape map header to reflect the one or more dynamically overlayed fields, and storing the tape map header to the memory. In this way, which fields are overlayed may be indicated to a system which attempts to read and decipher the tape map, so that the data being collected is properly formatted and identified in the visual representation of the tape map. The tape map header, in some approaches, may be stored with the tape map, or separately.

In more embodiments, the tape map header may include an owner of an interface from which the one or more user-specified parameters may be sourced.

According to one embodiment, a computer program product comprising a computer readable storage medium having computer readable program code embodied therewith may be used to provide dynamic storage of data from the operation of a tape drive.

The computer readable program code may comprise code configured to monitor a plurality of parameters relating to operation of a tape drive to collect data from the operation of the tape drive, code configured to receive a specification of one or more user-specified parameters to log during one or more collection windows, wherein the one or more user-specified parameters are specified from the plurality of parameters, code configured to log at least some of the data collected from the operation of the tape drive to a memory during the one or more collection windows, wherein the at least some of the data collected is stored in a tape map comprising a plurality of fields, and code configured to dynamically overlay one or more fields from the plurality of fields with data collected from the one or more user-specified parameters. The plurality of fields comprise at least one histogram field, at least one per-channel field, and at least one per-channel indicator field.

The computer program product may further comprise computer readable program code configured to provide a user with an interface to specify one or more parameters from the plurality of parameters to log in the tape map, in one approach.

In another approach, the computer program product may further comprise computer readable program code configured to send the tape map from the memory to another system.

In yet another approach, the computer program product may further comprise computer readable program code configured to dynamically alter the one or more collection windows in response to receiving a user-specified collection window for one of the one or more user-specified parameters.

In another approach, the computer program product may further comprise computer readable program code configured to identify an owner of an interface from which at least one of the one or more user-specified parameters are sourced.

In one embodiment, the computer program product may further comprise computer readable program code configured to alter a tape map header to reflect the one or more dynamically overlayed fields, and computer readable program code configured to store the tape map header to the memory. In a further embodiment, the owner of the interface from which the one or more user-specified parameters are sourced may be stored to the tape header.

In another embodiment, the one or more collection windows may be defined by a period between datasets, a period between wrap boundaries, a period between region boundaries, or a period between event occurrences, or based on any other criteria as would be understood by one of skill upon reading the present descriptions.

In yet another embodiment, the event may include at least one of: a user-specified event, and passage of a predetermined amount of time.

The methods, systems, and embodiments described herein have many advantages over conventional techniques. The embodiments herein have a self-defining nature at a complex level. The overlay design introduces flexibility and range in that one overlay architecture may manage differences in default tape map logging across a wide range of tape drive manufacturers, recording formats, tape drive generations, and base logging modes. Depending on the configuration of these variables at cartridge load, the Read Tape Map command identifies to the user which default fields are available for overlay and what counter sizes apply. Since it is a self-defining interface, the user (or test case) does not need to derive the information independently or be aware of microcode changes supporting this area.

Another advantageous aspect is that the embodiments described herein are self-defining in that there is not a defined set of reconfiguration options. The tape map is variable in size and content as well as evolutionary over time. This is a major advantage over conventional techniques concerning host reconfiguration of a device. In essence, the tape drive indicates what, when, and how the default tape map logging area can be overlaid, and not the other way around.

The tape map techniques described herein are adaptable. As time and development continue, different overlay options and/or limitations may be incorporated into the embodiments described herein. Since the interface is self-defining, these overlay logic changes may be added without affecting the user interface.

Another advantage includes leverage of existing tools to strengthen complex failure analysis involving any number of functional areas in the drive. Overlays are especially targeted to iterative failure analysis, where logging overlays may change quite dramatically over a short period of time. When formatted, the tape map is a visual representation of a multi-dimensional static analysis. Using the techniques described herein, data collected may dynamically overlay default tape map logging in order to introduce and/or modify data collection sources, data collection algorithms, and/or data collection timing windows. So, when the tape map is visually formatted, static analysis of it may be modified to include new metrics in relation to default metrics.

As the implementation develops, some of the more valuable overlays may be allowed to become "defined" overlays. In this case, users may simply request a defined overlay using the Tape Map Write command, in some approaches.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    monitoring a plurality of parameters relating to operation of a tape drive to collect data from the operation of the tape drive;
    receiving a specification of one or more user-specified parameters to log during one or more collection windows, wherein the one or more user-specified parameters are specified from the plurality of parameters;
    logging at least some of the data collected from the operation of the tape drive to a memory during the one or more collection windows, wherein the at least some of the data collected is stored in a tape map comprising a plurality of fields, the plurality of fields comprising:
        at least one histogram field;
        at least one per-channel field; and
        at least one per-channel indicator field; and
    dynamically overlaying one or more fields from the plurality of fields with data collected from the one or more user-specified parameters.

2. The method as recited in claim 1, further comprising dynamically altering the one or more collection windows in response to receiving a user-specified collection window for one of the one or more user-specified parameters.

3. The method as recited in claim 1, further comprising:
    altering a tape map header to reflect the one or more dynamically overlayed fields; and
    storing the tape map header to the memory.

4. The method as recited in claim 1, wherein the one or more collection windows are defined by a period between datasets, a period between wrap boundaries, a period between region boundaries, or a period between event occurrences.

5. The method as recited in claim 1, further comprising identifying an owner of an interface from which at least one of the one or more user-specified parameters are sourced.

6. The method as recited in claim 1, wherein the one or more fields from the plurality of fields is substituted in the tape map with data collected from the one or more user-specified parameters.

7. The method as recited in claim 1, wherein the user-specified parameters are parameters which are not recorded in the tape map by default.

8. The method as recited in claim 1, further comprising providing a user with an interface to specify one or more parameters from the plurality of parameters to log in the tape map.

9. A method, comprising:
    monitoring a plurality of parameters relating to operation of a tape drive to collect data from the operation of the tape drive;
    receiving a specification of one or more user-specified parameters to log during one or more collection windows,
    wherein the one or more user-specified parameters are specified from the plurality of parameters;
    logging at least some of the data collected from the operation of the tape drive to a memory during the one or more collection windows,
    wherein the at least some of the data collected is stored in a tape map comprising a plurality of fields; and
    dynamically overlaying one or more default fields from the plurality of fields with data collected from the one or more user-specified parameters, wherein the user-specified parameters are parameters which are not recorded in the tape map by default.

10. The method as recited in claim 9, further comprising dynamically altering the one or more collection windows in response to receiving a user-specified collection window for one of the one or more user-specified parameters.

11. The method as recited in claim 9, further comprising:
    altering a tape map header to reflect the one or more dynamically overlayed fields; and
    storing the tape map header to the memory.

12. The method as recited in claim 9, wherein the one or more collection windows are defined by a period between datasets, a period between wrap boundaries, a period between region boundaries, or a period between event occurrences.

13. The method as recited in claim 9, further comprising identifying an owner of an interface from which at least one of the one or more user-specified parameters are sourced.

14. The method as recited in claim 9, wherein the one or more fields from the plurality of fields is substituted in the tape map with data collected from the one or more user-specified parameters.

15. The method as recited in claim 9, wherein the user-specified parameters are parameters which are not recorded in the tape map by default.

* * * * *